United States Patent [19]

Nagler

[11] 3,865,508
[45] Feb. 11, 1975

[54] RAMJET POWERED ROTOR BLADE
[75] Inventor: Bruno A. Nagler, Scottsdale, Ariz.
[73] Assignee: Nagler Aircraft Corporation, Phoenix, Ariz.
[22] Filed: Oct. 19, 1972
[21] Appl. No.: 299,074

[52] U.S. Cl. .................................. 416/22, 416/91
[51] Int. Cl. ........................................... B64c 27/18
[58] Field of Search ............. 416/21, 22, 23, 24, 91, 416/20, 90 A

[56] References Cited
UNITED STATES PATENTS

| | | | |
|---|---|---|---|
| 2,553,253 | 5/1951 | Hays | 416/22 |
| 2,689,614 | 9/1954 | Spalding | 416/22 |
| 2,703,624 | 3/1955 | Shapiro et al. | 416/22 |
| 2,931,441 | 4/1960 | Root | 416/22 |
| 2,941,600 | 6/1960 | Koning et al. | 416/22 |
| 3,120,274 | 2/1964 | Irbitis | 416/21 |
| 3,610,555 | 10/1971 | Nagler | 416/22 UX |
| 3,699,771 | 10/1972 | Chelminski | 416/22 UX |

FOREIGN PATENTS OR APPLICATIONS
475,836  8/1951  Canada .................. 416/22

*Primary Examiner*—Everette A. Powell, Jr.
*Attorney, Agent, or Firm*—Cahill, Sutton & Thomas

[57] ABSTRACT

An airfoil shaped, tip mounted ramjet is disclosed for powering a horizontal rotor of a vertically ascending and descending aircraft. The ramjet exhaust port is selectively opened and closed by an airfoil shaped vane. When the exhaust port is closed, the vane acts as an extension of the airfoil defined by the ramjet to reduce the drag of the ramjet while the latter is unenergized. When the exhaust port is opened, the vane acts as a lift producing device without impeding the operation of the ramjet. The movement of the vane, closing and opening the exhaust port, is controlled by an actuating mechanism responsive to the fuel flow to the ramjet.

11 Claims, 4 Drawing Figures

RAMJET POWERED ROTOR BLADE

The present invention relates to power systems for vertically rising aircraft, and more particularly, to rotor mounted power systems.

Vertically ascending and descending aircraft are generally considered to be either one of two types, a helicopter or an autogyro. Helicopters obtain their lift through the rotation of a horizontally oriented rotor blade. The power is generally obtained from an engine disposed within the body of the helicopter, which engine, through a complex sophisticated gearing mechanism, drives the horizontal rotor. The rate of ascent or descent is controlled by varying the pitch of the rotor blades with the forward, sideways, or rearward movement controlled by varying the cyclical pitch of the rotor, that is, tilting the plane of the rotor in the direction of the desired line of travel. In addition, a vertically oriented tail rotor, driven by the same engine through a transmission, pivots the body or fuselage of the helicopter about the axis of the horizontal rotor to maintain the fuselage aligned with the direction of travel. The tail rotor also compensates for the torque produced by the main engine and thereby prevents the fuselage from spinning or rotating in the opposite direction to that of the horizontal rotor.

An autogyro includes an engine disposed in the fuselage, which engine drives a vertically oriented propeller located at the nose of the fuselage to provide thrust in the forward direction. A freely rotating horizontal rotor is mounted above the fuselage. Vertical and horizontal control surfaces are disposed at the rear of the fuselage, which control surfaces orient the positions of the fuselage by reacting against the slip stream during forward motion of the autogyro. Generally, the pitch angle of the rotor blades and the cyclical pitch of the rotor is controllable by a pilot. In operation, the forward movement of the autogyro is effected by the thrust-producing propeller. The air stream created by the forward motion of the autogyro acts upon the horizontal rotor, causing the latter to spin. The spinning of the horizontal rotor, through effective use of the blade pitch and cyclical pitch controls, produces a variable degree of lift. The rearward mounted vertical and horizontal control surfaces orient the fuselage of the autogyro for directional and attitude control.

Although each of the above-described types of vertically ascending and descending aircraft have distinct advantages, they also suffer from distinct but not necessarily unrelated disadvantages. The helicopter requires a generally high-powered, bulky and heavy engine to rotate the rotor. The accompanying transmission is complex and expensive. The control systems as well as the rotor shaft itself must be of special heavy duty design to satisfactorily meet the expected loads. The helicopter also suffers from an operational limitation known as a "dead man's curve." This curve represents a variety of combinations of forward speed and height above ground, which combinations will not permit a safe landing by employing the technique of auto-rotation in case of engine failure. Thus, at low altitudes, the helicopter must maintain a substantial forward speed in order to be capable of performing a safe landing should the engine fail.

An autogyro is dependent upon a forward movement in order that the horizontal rotor keep rotating to generate lift. Necessarily, the autogyro must take off and land similarly to that of conventional airplanes. Because of this dependence upon forward speed to maintain a sufficient rotational speed of the horizontal rotor, only brief and momentary vertical ascents can be effected. Should the engine fail and thrust cease, the autogyro can descend safely through auto-rotation. However, the performance characteristics of the autogyro also include a dead man's curve.

Many developments have been made over the years in an attempt to minimize the above-discussed disadvantages of the two main categories of vertically ascending and descending aircraft. One of the more significant marriages effected between these two types of aircraft, which marriage obviates many of the disadvantages of each, is an aircraft known as a vertigyro. The vertigyro incorporates one engine to produce thrust in the forward direction. A second engine is used to power a horizontal rotor. Control surfaces similar to that of the autogyro are also used. With this aircraft, sustained vertical ascent is possible through the powered horizontal rotor. Sustained horizontal flight is effected by flying the aircraft as an autogyro with or without power being applied to the horizontal rotor. Pitch and directional control is effected through a combination of pitch control and cyclic pitch of the rotor blades as well as movement of the air control surfaces. A disadvantage of the vertigyro type of aircraft that still existed was that of transmitting power to the rotor. Despite various significant improvements in this area, the power source and power transmission was expensive and to some extent dampened general acceptability of the vertigyro.

Another development of interest has been carried on in the United States and with a fair degree of success in foreign countries, notably the Netherlands. In an otherwise conventional helicopter configuration, the fuselage mounted engine for powering the rotor was replaced by ramjets mounted at the tips of the rotor blades. A small engine, operating through a light transmission, powered the rear vertical rotor to provide directional stability. With the motive means being removed from within the fuselage to the tips of the rotor blades, the previously required expensive and heavy engine was completely obviated. In addition, the utter simplicity of a ramjet offered the elimination of complex fuel and ignition systems and vast simplification of the rotor hub and rotor shaft assembly. This aircraft, known as the Kolibrie helicopter, performed all of the required performance tests and became the world's first ramjet helicopter to receive a certificate of airworthiness.

The obvious advantages of using a power source at the tip of the rotor blades of a helicopter include: no engine cooling; no complicated transmission; no heavy gear box; no free wheel; no clutch; and no torque compensation. Where the power means is supplied by a ramjet engine, there are additional advantages, among them: simplicity of design; reduction of maintenance; low weight; no fuel pump; and a high inertia rotor. The disadvantages of using the ramjet must, of course, also be discussed. They are: first, high fuel consumption; second, high noise level; third, high drag.

Because of the outstanding advantages in using a ramjet engine mounted at the tips of the rotor blades, many individuals and several organizations, including the United States Army, have allocated funds for developmental work in this area. In order to combat the disadvantages of ramjets, that is, the noise, drag, and high fuel consumption, Marquardt Aircraft Company performed substantial developmental work on a two-dimensional ramjet engine. The company found, through testing, that a ramjet need not necessarily be axially symmetrical to provide the greatest efficiency. In fact, an elongated or rectangular inlet, combustion chamber and outlet performed as well as, and in some cases better than, the standard cylindrical ramjet.

One of the primary reasons for this result is that of the centrifugal force imposed upon the flame within the ramjet. In the axial ramjet, the apparatus is symmetrically orieented about the longitudinal axis. The centrifugal force tending to shift the combustion from the center of the ramjet to one side misaligns the combustion with the flame holders and other symmetrically aligned mechanisms, which misalignment reduces the degree of combustion. In a rectangularly shaped ramjet, the combustion is also subjected to the centrifugal force which tends to shift the combustion. However, the shift does not misalign the combustion to the same extent as within the axial ramjet as the flame holders and other mechanisms are positioned across the full width of the ramjet rather than being symmetrically oriented about the longitudinal axis of the ramjet.

With this knowledge, Marquardt Aircraft Company developed a ramjet which had a rectangular combustion chamber and an outer surface generally conforming to the airfoil shape of the rotor blades. Various air inlets, both fixed and variable, were attempted. It was determined that variable air inlets were not practical from the standpoint of the degree of control required versus the benefit obtained. It was further found that if the outlet could be sealed, there occurred an air pressure buildup adjacent the air inlet, which buildup tended to conform to the leading edge of the airfoil. Thus, closing the air inlet offered little if any advantages provided that the air outlet could be closed.

Various designs were attempted to permit a selective and effective opening and closing of the air outlet. The design finally considered to be the most adequate from the standpoint of control, efficiency and operability was that of employing flexible sheeting at the top and bottom rear portions of the ramjet. The air outlet was opened by forcing the outer lateral side of the ramjet toward the inner lateral side of the ramjet. Such movement of the outer side forced the flexible sheeting to flex apart and form a generally diamond-shaped air outlet.

The control of the outer side of the ramjet could be effected by any one of several mechanical means and presented no serious problems. A problem which had developed, however, was that of the selection of the flexible material. Lightweight was a major consideration to obviate the need for extensive ballasting at the leading edge of the rotor to maintain the center of gravity at a satisfactory point. The use of aluminum, because of its light weight, proved unsatisfactory in that the aluminum could not sustain the high temperatures of the combustion gases. Flexible titanium was then attempted and proved satisfactory in many respects. However, the material and fabrication costs increased the cost of the ramjet to a near prohibitive level.

The results of the work performed by Marquardt Aircraft Company established several propositions. First, non-cylindrical ramjets are feasible and workable. Second, an airfoil shaped ramjet has less drag than a cylindrically shaped ramjet. Third, an airfoil shaped ramjet can provide positive lift during auto-rotation provided that the air outlet is sealed. Fourth, the high rotor inertia of tip mounted ramjets eliminates the dead man's curve for such helicopters.

It is therefore a primary object of the present invention to provide a practical rotor blade tip mounted ramjet engine.

Another object of the present invention is to provide a mechanically simple mechanism for opening and closing the exhaust port of a ramjet engine.

Yet another object of the present invention is to provide a high inertia horizontal rotor.

Still another object of the present invention is to provide an exhaust port closing mechanism for ramjet engines which permits the use of low melting point materials in the closure mechanism.

A further object of the present invention is to provide a means for automatically opening the exhaust port of a ramjet engine on energization of the ramjet engine.

A yet further object of the present invention is to provide a low drag tip mounted ramjet engine during non-energization of the ramjet engine.

A still further object of the present invention is to provide an automatic generation of additional lift during the operation of a tip mounted ramjet engine.

A still further object of the present invention is to provide an autogyro with a selectively energizable rotor blade to permit vertical ascent or descent.

These and other objects of the present invention will become apparent to those skilled in the art as the description thereof proceeds.

The present invention may be understood with more specificity and clarity with reference to the following figures, in which.

Figure 1:
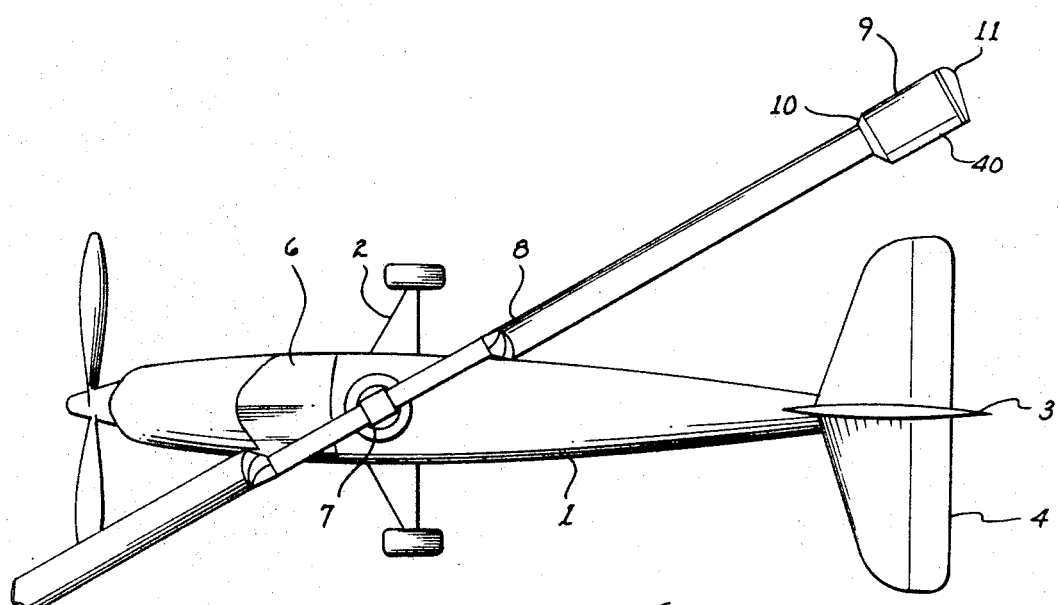
FIG. 1 illustrates an environment of the present invention.

Referring to FIG. 1, there is shown an environment for the present invention. The environment shown is that of an aircraft generally similar to a vertigyro. That is, it includes a fuselage 1 supported by landing gear 2. A propeller 5, driven by an engine within the fuselage 1, provides forward thrust. The vertical and horizontal stabilizers 3 and 4, respectively, located at the rear of the aircraft, provide pitch attitude and directional stability. A cockpit 6, generally disposed below the center of the rotor blade 8, houses the occupants an any cargo to be carried. A rotor shaft extends upwardly from fuselage 1. The rotor hub 7 of rotor blade 8 is fixedly secured to the rotor shaft. In addition, control mechanisms such as blade pitch, cyclical pitch, etc. fuel lines, and electrical lines extend from fuselage 1 to rotor hub 7 about or through the interior of the rotor shaft. An airfoil shaped ramjet engine 9 is disposed at the tips of each of the rotor blades.

The operation of the ramjet powered rotor 8 may be described as follows. A ramjet must have a forward velocity to operate. Therefore, auxiliary starting means must be provided to rotate the rotor 8 at a sufficient rotation rate to have the ramjet engines 9 travel through the air at a minimum speed. A simple practical solution for starting is that of mounting a small low horespower (i.e. 2hp) engine within the fuselage 1. A light gear box may be used to harness the engine output to the rotor. When the ramjet engines 9 fire, the small engine can be disconnected and shut down.

Further, not immediately evident, benefits available by using tip mounted ramjets are those associated with the fuel flow requirements. To initiate a fuel flow to the ramjets, a fuel pump must be employed. However, once the rotor is rotating, the centrifugal force acting upon the fuel within the fuel lines in the rotor will continue to draw fuel into the ramjets and the fuel pump may be shut off.

By using ramjets at the tips of a horizontal rotor, whether the aircraft is a helicopter, autogyro or vertigyro, the emergency performance capability is greatly increased. In example, if each engine weighs approximately 20 pounds and is mounted on a 33 foot motor, the engines represent a large amount of rotational kinetic energy—a decrease of only twenty rotor RPM in two seconds is equivalent to an extra 40 hp during that period. For a gross weight of 1,434 pounds, this kinetic energy could be converted to an additional 20 feet per second rate of climb. This large reservoir of available power provides a substantial increase in maneuvering capability in emergency situations.

Another generally accepted disadvantage of ramjets is that of high fuel consumption. When the present invention is employed in an environment such as a vertigyro, the ramjets need only be activated during vertical ascent. While cruising, the ramjets can be shut down and the aircraft operated as an autogyro. Thereby, the fuel capacity otherwise necessary for extended flight times can be drastically decreased.

The width of ramjet engine 9 is shown as being somewhat greater than the core of the rotor blade 8. For rotor blades, such as might be used in the present invention, the chord is approximately 9 to 10 inches. The thickness of the airfoils used in rotor blades generally varies between 12 to 14 percent of the chord. Thus, the thickness of the rotor blade 8 may vary between 1 to 1 ½ inches. While a rectangularly shaped ramjet engine can be designed within this range, such a design would not provide the best balance between cost, maintenance and power. For this reason, the width of ramjet engine 9 has been increased over that of the rotor blade 8 to permit the ramjet engine 9 to maintain the same airfoil shape as the rotor blade 8 and permit an increased thickness. A fairing 10 is disposed intermediate the rotor blade 8 and ramjet engine 9 to reduce the induced drag to a minimum. Similarly, the shape of the tip 11 is configured to obtain a minimum induced drag.

Figure 2:
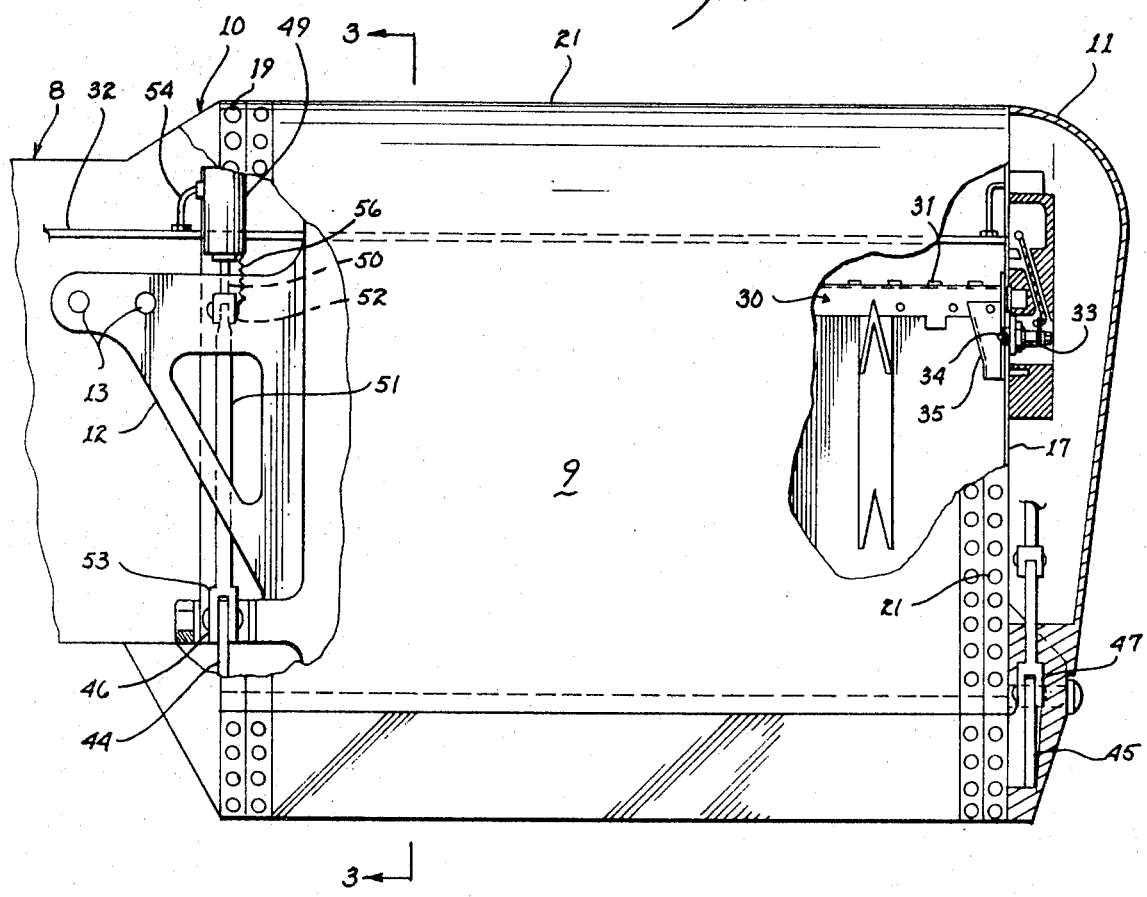
FIG. 2 illustrates the ramjet engine of the present invention.

The ramjet engine 9 of the present invention will be described in further detail with joint reference to FIGS. 2 and 3. The ramjet engine 9, airfoil shaped in cross section, is secured to the rotor blade 8 by means of a tongue 12 fitting within rotor blade 8. Tongue 12 includes one or more apertures 13. Bolts (not shown) engage apertures 13 and corresponding cavities within blade 8 to secure the tongue 12 within the rotor blade. The fairing 10 is disposed intermediate blade 8 and ramjet engine 9 to minimize the air flow discontinuities between the rotor blade and the ramjet engine.

The ramjet engine 9 includes a generally rectangular slot 20 disposed along the leading edge 21. This slot 20 defines the air inlet to the ramjet engine. The exterior configuration or envelope of the ramjet engine 9 is defined by an upper skin 14 and a lower skin 15 formed around and secured to inboard rib 16 and outboard rib 17. Each of these ribs includes a flange along its perimeter whereby the upper and lower skins 14 and 15 may be secured thereto by flush mounted screws 18 and 21. The previously discussed fairing 10 is secured to the flange of rib 16 by a plurality of flush mounted screws 19.

An upper diffuser fairing 22 is positioned in proximity to the front of the ramjet engine 9. The upper surface of diffuser fairing 22 includes a depression 24, which depresssion receives the front part of upper skin 14. The upper skin 14 is butted against the front edge of depression 24 to form an unbroken outer surface between diffuser fairing 22 and upper skin 14. A lower diffuser fairing 23 is also positioned in proximity to the front of ramjet engine 9. It also includes a depression 25 for receiving the front part of lower skin 15. Lower skin 15 is butted against the front of depression 25 to form an unbroken outer surface between fairing 23 and the lower skin. As will now be obvious, the perimeter of slot 20 is defined by ribs 16 and 17 and the leading edge of diffuser fairings 22 and 23.

The fuel feed assembly 30, connected to a fuel line 32 from rotor hub 7 through blade 8, extends intermediate ribs 16 and 17 and is positioned approximately along the 30 percent chord line. A plurality of fuel nozzles 31 extend forwardly from the fuel feed assembly 30. These nozzles 31 direct a fuel mist directly toward the air inlet through slot 20.

An igniter 33 is mounted on rib 17 with the igniting element 34 extending into the combustion chamber defined by upper and lower skins 14 and 15 and ribs 16 and 17 to the rear of the fuel feed assembly 30. An igniter scoop 35 is secured to rib 17 and positioned about igniting element 34. The igniter scoop 35 aids in initiating combustion of the fuel-air mixture within the combustion chamber.

A plurality of pairs of flame holders 36 are secured to the fuel feed assembly 30 and extend rearwardly therefrom. The generally long V-shaped elements shown are intended to represent one type of a plurality of types of flame holders that might be employed. The exact configuration of the flame holders may be varied depending upon various operational criteria, such as operating temperature, heat conductivity of the surrounding materials, and flow rate through the ramjet engine.

One of the generally accepted drawbacks in using ramjets is that of the high noise level while the ramjet is operating. It is known that the noise created by an exhausting gas is proportional to the cross-sectional area of the exhaust divided by the perimeter of the exhaust area. For axial or cylindrical ramjets the perimeter is at a minimum as a circle presents the minimum perimeter for any given area and the noise level is at a maximum. However, given the same area but in the shape of a rectangle, a greater than minimum perimeter is required, thus, the noise level is reduced. In the present invention, the height and width of the exhaust port can be modified within the parameters established by the airfoil employed to maximize the perimeter and thereby reduce the noise level.

As previously mentioned, an airfoil shaped ramjet engine offers very little parasitic and induced drag provided that the exhaust outlet or port remain closed. To achieve this low drag capability, it is therefore incumbent upon the ramjet engine to incorporate practical apparatus for selectively closing the exhaust port during shut down of the ramjet engine without negatively affecting the exhaust port when the ramjet engine is operating. In addition, the opening and closing apparatus must be able to either withstand the high temperatures of the exhaust gases, or the apparatus must in some manner be insulated from the hot exhaust gas environment.

Figure 3:
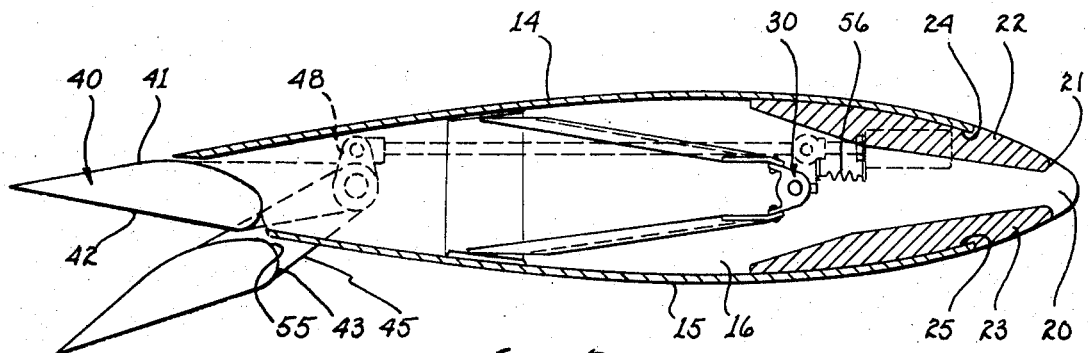
FIG. 3 illustrates a cross section of the ramjet as shown in FIG. 2 along lines 3—3.

A means for selectively opening and closing the exhaust port is shown primarily in FIG. 3. The trailing edge of upper skin 14 and lower skin 15 terminates at a point short of their intersection, with the upper skin extending somewhat beyond the lower skin. An airfoil shaped vane 40, in the nature of a flap, is disposed intermediate the trailing edges of upper skin 14 and lower skin 15. The shape of flap 40 is configured as a rearward continuation of the airfoil surfaces defined by upper skin 14 and lower skin 15 to the intersection of the upper and lower surfaces. In this manner, there is only an almost imperceivable airfoil discontinuity between the leading and trailing edges of ramjet engine 9.

The close spacing between the upper surface 41 of flap 40 and upper skin 14 and the lower part of leading edge 43 of flap 40 and the lower skin 15 tend to limit the rate of escaping air due to pressure buildup within the ramjet engine 9. Thus, a pressure buildup will occur within the ramjet engine 9 while flap 40 is in the closed position. The pressure buildup will, in turn, tend to form a generally curved pressure area extending outwardly of slot 20 at the leading edge 21. As the ramjet engine 9 travels through the air, the frontal pressure area will tend to act in the manner of a fixed leading edge to smoothly direct the flow of air adjacent the upper skin 14 and lower skin 15. In this manner, both the parasitic and induced drag of the jet engine is not much greater than that of a similarly shaped solid airfoil section.

Figure 4:
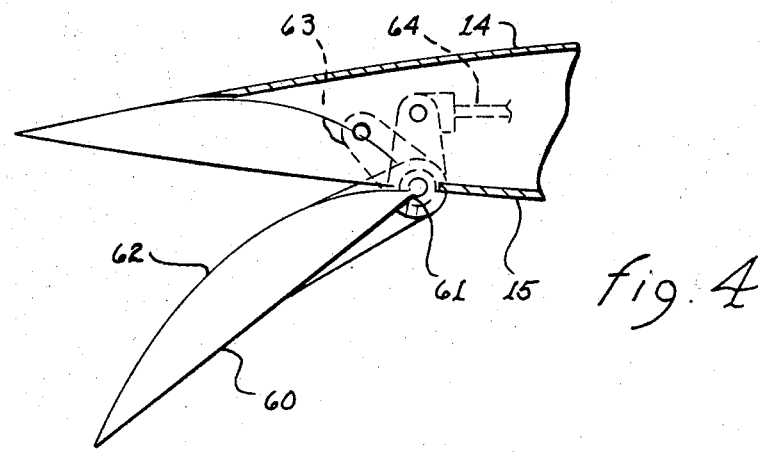
FIG. 4 illustrates a modification of the exhaust port closing mechanism of the present invention.

When the ramjet engine 9 is to be energized, flap 40 must of course be displaced in order to provide an exhaust port for the combusted gases. A simple method for displacing flap 40 is shown in FIGS. 3 and 4. A pair of levers 44 and 45 are secured to the lateral extremities of flap 40. These levers are pivotally secured to the main frame of the jet engine 9 through the bolt and bracket assembly 46 and 47, respectively. An arm 48 is fixedly secured to lever 45 in proximity to the lever pivot point. A hydraulic cylinder and piston assembly 49 is mounted within fairing 10 in proximity to the leading edge of rotor blade 8. The piston connecting rod 50 is connected to an actuating rod 51 through a fork and bolt assembly 52. The other end of actuating rod 51 includes a fork 53, which fork pivotally engages arm 48.

The actuating force for the hydraulic cylinder and piston assembly 49 is obtained from the fuel pressure within fuel line 32. When the throttle (not shown) is opened, fuel will flow through fuel line 32 to the fuel feed assembly 30. A part of the fuel will also flow through line 54 into the hydraulic cylinder and piston assembly 49. The pressure created by the flowing fuel to the hydraulic cylinder and piston assembly 49 will force the piston and connecting rod 50 rearwardly, that is, toward flap 40. The rearward force is transmitted through actuating rod 51, lever 48. The rearwardly pivoting lever 48, through lever 45, rotates flap 40 counterclockwise. The counterclockwise rotation of flap 40 disengages the flap from the upper skin 14 and lower skin 15, opening the exhaust port of the combustion chamber.

The angular displacement of flap 40 is a function of the mechanical linkages and piston travel. Because of the variations available in terms of piston travel and leverage arms, no exact dimensions will be stated. Instead, the function to be achieved will be defined so that those skilled in the art can embody actuating mechanisms of their own choosing providing that the same end result is still obtained.

In order to provide an unrestricted exhaust port, it is necesssary that flap 40 pivot counterclockwise through an angle sufficient for the flap 40 to be positioned below an imaginary line defined as the rearward extension of the outer surface of lower skin 15. By the geometry shown, the flap 40, when rotated downwardly, will not contact the trailing edge of lower skin 15. Instead, there will be formed a narrow slot which upper and lower perimeter is defined by the trailing edge of lower skin 15 and the upper leading edge 55 of flap 40.

With the flap 40 in the lowered position, several interesting and beneficial results are obtained. First, the separation between the trailing edge of lower skin 15 and the upper leading edge 55 provides a slot through which an increment of the air flowing adjacent the outer surface of the lower skin 15 will flow. This flow of air will tend to flow about the upper surface of flap 40 in the nature of a boundary layer and the boundary layer will act as an insulator in reducing the heat transfer from the discharging exhaust gases to flap 40. Thus, flap 40 in the extended position is not subjected to the detrimental effects of the high temperature exhaust gases.

As flap 40 is in a lower temperature environment than that presented by the exhaust gases, the material from which flap 40 is manufactured may be aluminum or other lightweight, high strength to weight ratio materials which may not be suitable for operation in high temperature environments. The feasibility of using lightweight materials further aids in balancing the ramjet engine about the desired center of gravity.

The second advantage obtained by the mechanical arrangement for actuating flap 40 is that in the lowered position, flap 40 increases the lift generated by the airfoil shaped ramjet engine in the same manner as a standard flap increases the lift of a wing. It is, of course, true that the use of a flap increases not only the lift capability but also the drag factor. The drag factor can be minimized by carefully selecting the airfoil shape of flap 40 and orienting the flap 40 in the lowered position at an angle which presents the best lift to drag ratio.

The operation of actuating and de-actuating flap 40 may be explained as follows. To fire the ramjet engine 9, the pilot simply activates a fuel pump and opens a throttle within the cockpit to permit fuel to flow to the ramjet engine 9. Simultaneously, he turns on the ignition to ignite the igniting element 34 of igniter 33. The fuel mist flowing through fuel nozzles 31 will be ignited by the energized igniting element 34, causing combustion to occur within the ramjet engine. The fuel flowing through fuel line 32 to the fuel feed asssembly 30 will also flow through line 54 to the hydraulic cylinder and piston assembly 49. The fuel pressure within line 32 and line 54 is sufficient to cause the piston and connecting rod 50 to be displaced rearwardly. The rearward displacement of connecting rod 50 forces actuating rod 51 rearwardly, which in turn pivots flap 40 downwardly through arm 48 and lever 45. Thus, on energizing the ramjet engine 9 by permitting fuel to flow thereto, flap 40 is automatically rotated downwardly to open the exhaust port.

When the pilot wishes to shut down the ramjet engine 9, he simply shuts off the fuel flow through line 32. The lack of fuel flow releases the pressure within the hydraulic cylinder and piston assembly 49. The downwardly rotated flap 40 is subjected to an upward force by the adjacent air stream tending to cause the flap to be rotated in a clockwise direction. Previously, the pressure within the hydraulic cylinder and piston assembly 49 prevented the clockwise rotation of the flap. Now, however, the lack of pressure within the hydraulic cylinder and piston assembly 49 no longer provides a restraining force on the flap 40 and flap 40 will rotate clock-wise to seal the exhaust port. To insure that flap 40 is securely positioned to seal the exhaust port, a bias spring 56 is disposed intermediate the connecting rod 50 and the housing of the hydraulic cylinder and piston assembly 49. Spring 56 will bias or urge flap 40 in the clockwise direction and securely position flap 40 across the exhaust port. The bias force provided by spring 56 must, of course, be overcome by the force acting upon the piston within the hydraulic cylinder the piston assembly 49.

In FIG. 4, there is shown a modification of the above-described flap 40. The off center pivot point shown in FIG. 3 may cause some mechanical complications or difficulties in some installations. To overcome these complications or difficulties, flap 60 can be pivoted about its leading edge 61; leading edge 61 being in proximity to the trailing edge of lower skin 15. A lever arm 63 is fixedly secured to flap 60 and serves at the actuating arm for rotating the flap. A partially shown actuating rod 64 is pivotally secured to lever arm 63. The other end of actuating arm 64 is connected to a hydraulic cylinder and piston assembly as described above. The actuation of flap 60 is identical to that described with respect to flap 40.

In order to prevent the hot exhaust gases from the ramjet engine 9 from impinging upon and causing possible damage to flap 60, there may be a spatial separation adjacent the leading edge 61 and the trailing edge of lower skin 15. The slot created by this spatial separation will permit an increment of the air flowing adjacent the outer surface of lower skin 15 to flow through the slot. The incremental air, drawn through the slot by the low static pressure of the exhaust gases, will tend to flow along the upper surface 62 of flap 60 and establish a thermal barrier between flap 60 and the hot exhaust gases. Thus, flap 60 may be fabricated from lightweight materials, such as aluminum, which might be damaged by the high temperatures of the exhaust gases.

In the energized position, flap 60 generates lift similar to that of a flap on a standard wing. In the closed position, flap 60 forms an extension of upper skin 14 and lower skin 15 to complete the airfoil shape of the ramjet engine 9, as discussed above with respect to flap 40.

In conclusion, the airfoil shaped ramjets mounted at the tips of the rotor in accordance with the present invention increases the rotational kinetic energy of the rotor; generates lift; reduces the drag; reduces the noise level of the ramjet; and permits the ramjet exhaust port to be opened anc closed as the fuel flow is turned on and off.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A ramjet disposed at the extremity of a rotor blade, said ramjet including fuel nozzles, an igniter, flame arrestors, and a combustion chamber, said ramjet comprising in combination:

a first rectangular slot disposed at the leading edge of the rotor blade, said first slot defining the intake port for said ramjet;

a second rectangular slot disposed at a point rearward of and in lateral alignment with said first slot in said rotor blade, said second slot defining the exhaust port for said ramjet;

an airfoil shaped envelope, including upper and lower skins, extending from said first slot to said second slot, said envelope enclosing the fuel nozzles, igniters and flame arrestors for said ramjet, said envelope being essentially devoid of any protrusions to disrupt the lift generating capability of the extremity of said rotor blade and defining a space of rectangular vertical cross-section;

a positionable vane pivotable with respect to said envelope in proximity to said exhaust port to open and close said exhaust port; and means for selectively pivoting said vane downwardly to a first position to increase the lift generating capability of the extremity of the rotor blade while simultaneously opening said exhaust port and pivoting said vane upwardly to a second position in alignment with the airfoil shape of said envelope to reduce the drag of the extremity of the rotor blade while simultaneously closing said exhaust port; whereby, said vane is positioned in said first position to increase the lift of the rotor blade while said ramjet is developing thrust and said vane is positioned in said second position to reduce the drag of the extremity of the rotor blade while said ramjet is not developing thrust.

2. The ramjet as set forth in claim 1 wherein said fuel nozzles and said flame arrestors are disposed transverse to the chord line of said airfoil shaped envelope.

3. The ramjet as set forth in claim 1, including a first member disposed interior to the upper part of said air inlet for defining the air flow adjacent thereto; and a second member disposed interior to the lower part of said air inlet for defining the air flow adjacent thereto.

4. The ramjet as set forth in claim 1 wherein said vane is air foil shaped.

5. The ramjet as set forth in claim 4 including hinge means for pivoting said vane with respect to said envelope.

6. The ramjet as set forth in claim 5 wherein said hinge means is removed from alignment with the leading edge of said vane whereby the leading edge of said vane describes an arc as said vane pivots from said first position to said second position.

7. The ramjet as set forth in claim 6 wherein said positioning means comprises a cylinder and piston assembly responsive to the flow of fuel to said ramjet; and an actuating mechanism disposed intermediate said piston and said vane whereby said vane will pivot about said hinge means in response to movement of said piston.

8. The ramjet as set forth in claim 5 wherein said hinge means is associated with the leading edge of said vane and aligned with the lower edge of said exhaust port.

9. The ramjet as set forth in claim 8 wherein said positioning means comprises a cylinder and piston assembly responsive to the flow of fuel to said ramjet; and an actuating mechanism disposed intermediate said piston and said vane; whereby said vane will pivot about said hinge means in response to movement of said piston.

10. The ramjet as set forth in claim 1 wherein said positioning means comprises a cylinder and piston assembly responsive to the flow of fuel to said ramjet.

11. The ramjet as set forth in claim 10 including means for biasing said vane in said second position.

* * * * *